(12) United States Patent
Zhao et al.

(10) Patent No.: US 8,588,195 B2
(45) Date of Patent: Nov. 19, 2013

(54) DATA TRANSMISSION METHOD, SYSTEM AND APPARATUS THEREOF

(75) Inventors: Yi Zhao, Beijing (CN); Yu Ding, Beijing (CN); Xiaodong Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 58 days.

(21) Appl. No.: 13/375,381

(22) PCT Filed: Jun. 9, 2010

(86) PCT No.: PCT/CN2010/073702
§ 371 (c)(1),
(2), (4) Date: Nov. 30, 2011

(87) PCT Pub. No.: WO2010/142236
PCT Pub. Date: Dec. 16, 2010

(65) Prior Publication Data
US 2012/0076068 A1      Mar. 29, 2012

(30) Foreign Application Priority Data
Jun. 9, 2009      (CN) .......................... 2009 1 0086566

(51) Int. Cl.
*H04L 12/26*      (2006.01)

(52) U.S. Cl.
USPC ........... 370/338; 370/328; 370/329; 370/331; 370/345; 370/480; 455/422.1; 455/432.1; 455/452.1; 455/455

(58) Field of Classification Search
USPC ......... 370/328–331, 336–339, 341–345, 437, 370/480–482, 491; 455/412, 168.1, 188.1, 455/418, 422.1, 432.1, 432.3, 434, 455/435.1–435.3, 436, 440, 444, 450, 455/452.1–452.2
See application file for complete search history.

(56) References Cited

U.S. PATENT DOCUMENTS

| | | | |
|---|---|---|---|
| 2003/0081692 A1* | 5/2003 | Kwan et al. | 375/295 |
| 2009/0073911 A1 | 3/2009 | Cheon et al. | |
| 2009/0262699 A1* | 10/2009 | Wengerter et al. | 370/330 |
| 2010/0290412 A1* | 11/2010 | Ahn et al. | 370/329 |
| 2011/0292895 A1* | 12/2011 | Wager et al. | 370/329 |

FOREIGN PATENT DOCUMENTS

| | | |
|---|---|---|
| CN | 150 4060 | 6/2004 |
| CN | 101 001 459 | 7/2007 |

* cited by examiner

*Primary Examiner* — Kibrom T Hailu
*Assistant Examiner* — Zewdu A Beyen
(74) *Attorney, Agent, or Firm* — Fay Kaplun & Marcin, LLP

(57) ABSTRACT

Disclosed are a data transmission method, a system and an apparatus, which are used to meet transmission quality requirements of data on multiple kinds of logic channels in the event that multiple kinds of logic channels related to multimedia broadcast multicast service (MBMS) are mapped to the same transmission channel. The data transmission method provided by the present invention includes that: a network side determines multiple kinds of modulation and coding schemes (MCSs) needed to be adopted when multiple kinds of logic channels are mapped to the same transmission channel, and notifies a terminal of correspondence between logic channels and MCSs; using MCSs needed to be adopted, the network side performs modulation and coding for the data on logic channels mapped to the transmission channel, then transmits it to the terminal through the transmission channel.

12 Claims, 5 Drawing Sheets

[ ] A sub-frame corresponding to an MCH

DATA TRANSMISSION METHOD, SYSTEM AND APPARATUS THEREOF

The present application is a U.S. National Stage of International Application No. PCT/CN2010/073702, filed 9 Jun. 2010, designating the United States, and claiming priority to Chinese Patent Application No. 200910086566.X filed 9 Jun. 2009.

FIELD OF THE INVENTION

The present invention relates to the field of communications and particularly to a data transmission method, system and device.

BACKGROUND OF THE INVENTION

The technology of Multimedia Broadcast Multicast Service (MBMS) is intended to provide a user in radio cellular systems with a multimedia broadcast and multicast service. The MBMS in a Long Term Evolution (LTE) system is also referred to as an evolved MBMS (eMBMS). The eMBMS in an existing LTE Release 9 (LTE R9) system is performed in MBMS/Unicast-mixed cells, that is, a unicast service can also be transmitted in a cell where an MBMS is transmitted to perform coordinated transmission of the unicast service and the MBMS by transmitting the MBMS at some instances of time and the unicast service at other instances of time. Furthermore, the MBMS is transmitted in the LTE R9 system with Multicast Broadcast Single Frequency Network (MBSFN) mode, that is, the same content of information is transmitted concurrently in multiple cells at the same frequency at the same time.

A logical channel is such an interface to a high layer protocol that is defined at a Media Access Control (MAC) layer which provides the logical channel with a data transmission service. The type of transmitted data service on different logical channel is distinguished by the type of the logical channel. A transport channel is an interface provided at a physical layer for a high layer (e.g., the MAC layer) to transmit data, and the type of the transport channel is defined dependent upon a transmission characteristic and a transmission scheme of the data at the physical layer.

In the LTE system, existing logical channels involved in transmission of an MBMS generally include a Broadcast Control Channel (BCCH), a Multicast Control Channel (MCCH) and a Multicast Traffic Channel (MTCH). Transport channels generally include a Multicast Channel (MCH), a Broadcast Channel (BCH) and a Downlink Shared Channel (DL-SCH), all of which are downlink channels.

In the LTE R9 system, logical channels and transport channels have a mapping relationship as illustrated in FIG. 1, where the BCCH is mapped onto the BCH or the DL-SCH, and in the MBMS/Unicast-mixed cells, the MTCH and the MCCH are mapped onto the MCH. These channels primarily function as follows.

(1) BCCH

System information is transmitted over the broadcast control channel from a network to a User Equipment (UE). For the MBMS, configuration information of the MCCH, e.g., the repetition period of the MCCH, an offset of a starting sub-frame of the MCCH, an amount of sub-frames occupied by the MCCH, and a configuration of Radio Link Control Unacknowledged Mode (RLC UM), is carried over the BCCH so that the UE can locate the resource of the MCCH, but no specific MBMS traffic information is carried over the BCCH.

(2) MCCH

The multicast control channel is a point-to-multipoint downlink channel over which MBMS-related control information is transmitted to the UE from the network, and one MCCH may correspond to one or more MTCHs, that is, control information of a plurality of MTCHs may be carried over the MCCH.

Information carried over the MCCH includes configuration information of an MBMS logical channel (e.g., the MTCH, and an MSCH), information of an MBMS Radio Bearer (RB) (e.g., the RB index information of RBs provided in a modification period of the MCCH), information of an MBMS Session Start, and information of an MBMS Session Stop.

(3) MTCH

The multicast traffic channel is a point-to-multipoint downlink channel over which specific MBMS traffic data is transmitted to the UE from the network.

The MTCH and the MCCH may be mapped onto the same MCH, that is, the MTCH and the MCCH are multiplexed at the MAC layer. The MTCH and the MCCH may be multiplexed at the MAC layer through Time Division Multiplexing (TDM), or TDM-based internal multiplexing in a Transport Block (TB).

Particularly, transmission of data over a transport channel through TDM refers to time-division transmission of data of logical channels multiplexed over the same transport channel, that is, data of only one of the logical channels multiplexed over the transport channel can be transmitted in one sub-frame allocated to the transport channel. With multiplexing through TDM, data information over the MTCH and the MCCH is transmitted respectively over different sub-frames corresponding to the MCH, as illustrated in FIG. 2.

As illustrated in FIG. 3, if the entire resource of a sub-frame can not be occupied by data of a logical channel, the remaining part of the sub-frame shall be filled with padding bits. Therefore, transmission of data over a transport channel through TDM-based internal multiplexing in a TB means that firstly data of a specific logical channel (or a set of logical channels), e.g., data of the MCCH, or a combination of data of the MCCH and another logical channel (e.g., the MBMS Scheduling Channel (MSCH) over which scheduling information of an MBMS is transmitted), is transmitted through TDM, and when all of the data over the specific logical channel or the set of logical channels in a specific sub-frame has been transmitted but the resource available from the TB of the sub-frame has not been exhausted, data of another logical channel (or a set of logical channels) is allowed to be transmitted in the same TB.

In the existing LTE system, one sub-frame corresponds to one TB for each transport channel, and only one Modulation and Coding Scheme (MCS) is adopted for the TB. Data of only one MCH transport channel may be present in an MBSFN sub-frame occupied for MBMS transmission. Since MBMS-related control information is carried over the MCCH, a different modulation and coding scheme from that for transmission of data of another logical channel (e.g., the MTCH) is typically adopted to improve the reliability of reception at the UE so that the UE can receive the MBMS-related control information reliably. However, when data of logical channels, such as the MCCH and the MTCH, is multiplexed over the same MCH, if a modulation and coding scheme preset for the MCCH is adopted for all of the sub-frames of the MCH, the spectrum efficiency will be low; or if a modulation and coding scheme preset for another logical channel (or a set of logical channels), e.g., the MTCH, is adopted for all of the sub-frames of the MCH, the reliability of the MCCH will fail to be ensured.

In summary, it is impossible in the existing LTE system to satisfy different transmission quality requirements of data over a plurality of types of MBMS-related logical channels mapped onto the same transport channel for which only one MCS can be adopted.

SUMMARY OF THE INVENTION

Embodiments of the invention provide a data transmission method, system and device to satisfy transmission quality requirements of data of a plurality of types of MBMS-related logical channels mapped onto the same transport channel.

A data transmission method according to an embodiment of the invention includes:

determining, at the network side, a plurality of Modulation and Coding Schemes (MCSs) required for the same transport channel onto which a plurality of types of logical channels are mapped, and notifying a user equipment of a corresponding relationship between the logical channels and the MCSs; and modulating and encoding, at the network side, data of the logical channels mapped onto the transport channel according to the required MCSs, and transmitting the data to the user equipment over the transport channel.

A data reception method according to an embodiment of the invention includes:

acquiring, by a user equipment, a corresponding relationship between a logical channel among a plurality of types of logical channels mapped onto the same transport channel and an MCS, which is notified from the network side;

determining, by the user equipment, from the corresponding relationship between the logical channel and the MCS, the MCS adopted for data of the logical channel transmitted over the transport channel from the network side; and demodulating and decoding, by the user equipment, the data of the logical channel according to the determined MCS.

A data transmission device according to an embodiment of the invention includes:

an MCS notification unit configured to determine a plurality of Modulation and Coding Schemes (MCSs) required for the same transport channel, onto which a plurality of types of logical channels are mapped, and notify a user equipment of a corresponding relationship between the logical channels and the MCSs; and a transmission processing unit configured to modulate and encode data of the logical channels mapped onto the transport channel according to the required MCSs and transmit the data to the user equipment over the transport channel.

A user equipment according to an embodiment of the invention includes:

a corresponding relationship acquisition unit configured to acquire a corresponding relationship between a logical channel among a plurality of types of logical channels mapped onto the same transport channel and a Modulation and Coding Scheme (MCS), which is notified from the network side;

an MCS determination unit configured to determine, from the corresponding relationship between the logical channel and the MCS, the MCS adopted for data of the logical channel transmitted over the same transport channel from the network side; and a processing unit configured to demodulate and decode the data of the logical channel according to the MCS determined by the MCS determination unit.

A communication system according to an embodiment of the invention includes:

a base station configured to determine a plurality of Modulation and Coding Schemes (MCSs) required for the same transport channel, onto which a plurality of types of logical channels are mapped and notify a user equipment of a corresponding relationship between the logical channels and the MCSs, and modulate and encode data of the logical channels mapped onto the transport channel according to the required MCSs and transmit the data to the user equipment over the transport channel; and the user equipment configured to acquire the corresponding relationship, determine, from the corresponding relationship between the logical channels and the MCSs, the MCSs adopted for the data of the logical channels transmitted over the transport channel from the network side and demodulate and decode the data of the logical channels according to the determined MCSs.

In the embodiments of the invention, a plurality of Modulation and Coding Schemes (MCSs) required for the same transport channel, onto which a plurality of types of logical channels are mapped, are determined at the network side, and a user equipment is notified of a corresponding relationship between the logical channels and the MCSs; and data of the logical channels mapped onto the transport channel is modulated and encoded at the network side according to the MCSs required for the transport channel and then transmitted to the user equipment over the transport channel, so that the MCSs can be adopted over the transport channel, onto which the plurality of types of MBMS-related logical channels are mapped, to thereby satisfy transmission quality requirements of data of the plurality of types of logical channel.

DETAILED DESCRIPTION OF THE EMBODIMENTS

Embodiments of the invention provide a data transmission method, system and device to satisfy transmission quality requirements of data over a plurality of types of MBMS-related logical channels mapped onto the same transport channel.

Technical solutions according to the embodiments of the invention will be described hereinafter with reference to the drawings.

Figure 4:
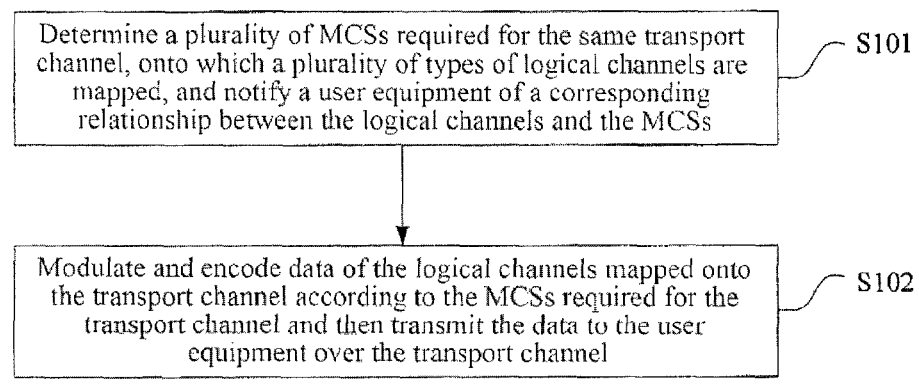
FIG. 4 is a schematic diagram of a general flow of a data transmission method according to an embodiment of the invention.

Referring to FIG. 4, a data transmission method according to an embodiment of the invention includes the following steps.

S101. A plurality of Modulation and Coding Schemes (MCSs) required for the same transport channel, onto which a plurality of types of logical channels are mapped, are determined at the network side, and a user equipment is notified of a corresponding relationship between the logical channels and the MCSs.

S102. Data of the logical channels mapped onto the transport channel is modulated and encoded at the network side according to the required MCSs and then transmitted to the user equipment over the transport channel.

Preferably, the corresponding relationship between the logical channels and the MCSs may be represented as a corresponding relationship between the logical channels and indexes of the MCSs. Here a type of logical channel corresponds to only one MCS at a transmission instance of time, and each type of logical channel may or may not correspond to the same MCS.

In an embodiment of the invention, the user equipment may be notified of the corresponding relationship in the step S101 in the following two ways:

the user equipment is notified of the corresponding relationship over a BCCH; or one or more types of specific logical channels among the plurality of types of logical channels mapped onto the same transport channel are determined; a corresponding relationship between the specific logical channel(s) and MCS(s) or index(es) of the MCS(s) is transmitted to the user equipment over the BCCH; and a corresponding relationship between the other logical channels mapped onto the same transport channel than the specific logical channel(s) and MCSs or indexes of the MCSs is transmitted to the user equipment over the specific logical channel(s).

Preferably, the method further includes: before the data of the plurality of types of logical channels is transmitted at the network side to the user equipment over the same transport channel, the user equipment is notified at the network side of an amount of sub-frames and/or serial numbers of the sub-frames occupied respectively for the plurality of types of logical channels mapped onto the same transport channel.

In an embodiment of the invention, the data of the logical channels mapped onto the same transport channel may be modulated and encoded at the network side according to the MCSs required for the transport channel in the step S102 in the following two ways:

when the data of the plurality of types of logical channels is transmitted over the same transport channel through TDM, data of each type of logical channel is modulated and encoded at the network side according to an MCS corresponding to the logical channel; and when the data of the plurality of types of logical channels is transmitted over the same transport channel through TDM-based transport block multiplexing, data of more than one types of logical channels to be transmitted in the same sub-frame is modulated and encoded at the network side according to an MCS with the highest reliability among MCSs corresponding respectively to the more than one types of logical channels while modulating and encoding data of one of the types of logical channels to be transmitted in a separate sub-frame according to an MCS corresponding to the logical channel.

A description will be given below of how to satisfy transmission quality requirements of data over a plurality of types of MBMS-related logical channels mapped onto the same transport channel by way of an example in which an MCCH and an MTCH are mapped onto the same transport channel MCH.

Figure 1:
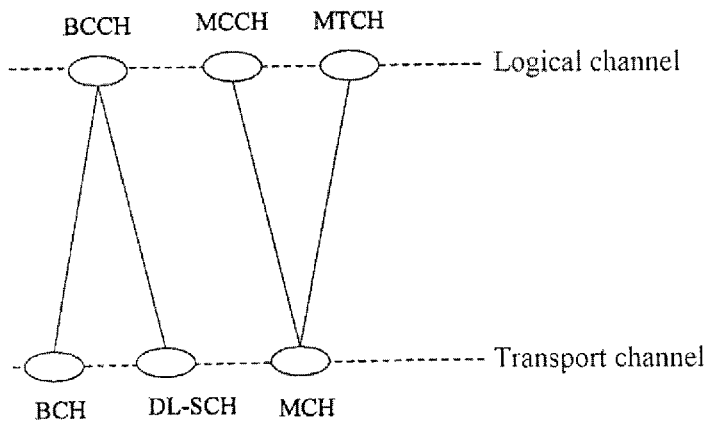
FIG. 1 is a schematic diagram of a mapping relationship between logical channels and transport channels.
Figure 2:
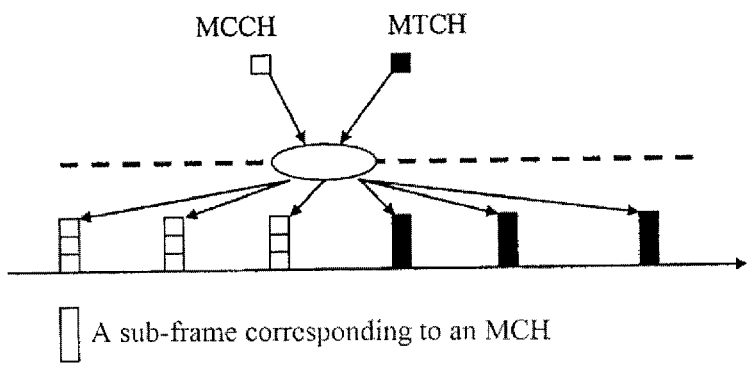
FIG. 2 is a schematic diagram of multiplexing MCCH data and MTCH data through TDM.
Figure 3:
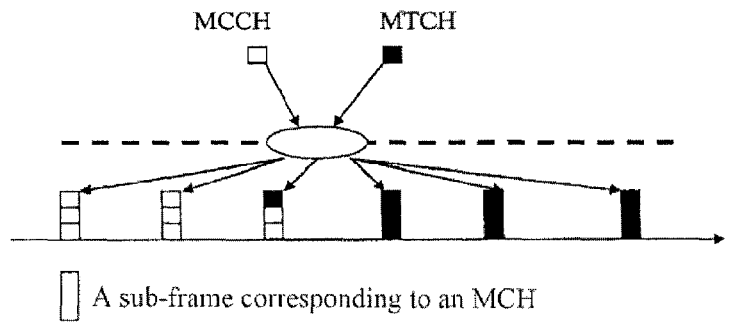
FIG. 3 is a schematic diagram of multiplexing MCCH data and MTCH data through TDM-based transport block multiplexing.

In a system providing an MBMS service, MBMS control information is transmitted over an MCCH while ensuring reliable reception of the MBMS control information at a UE; and specific MBMS traffic information is transmitted over an MTCH while ensuring the spectrum efficiency to some extent. In an embodiment of the invention, MCSs of a transport channel are configured so that the reliability of reception of the MCCH can be improved while ensuring the spectrum efficiency of transmitting the MTCH when the MCCH and the MTCH are mapped onto the same transport channel MCH. A specific design of modulation and coding schemes of the transport channel MCH is as follows:

when data of the MCCH and the MTCH is multiplexed through TDM as illustrated in FIG. 2, the data of the MCCH is transmitted in a part of sub-frames allocated to the MCH onto which the MCCH and the MTCH are mapped, and the data of the MTCH is transmitted in another part of the sub-frames. Different MCSs are adopted respectively for the sub-frames for transmitting the MCCH data and the sub-frames for transmitting the MTCH data.

when the data of the MCCH and the MTCH is multiplexed through TDM-based Transport Block (TB) multiplexing as illustrated in FIG. 3, that is, the MCCH data and the MTCH data may be transmitted in the same sub-frame, an MCS preset for the MCCH is adopted for a sub-frame carrying the MCCH data, and an MCS preset for the MTCH is adopted for a sub-frame without any MCCH data.

The UE may know of which MCS is adopted for which type of logical channel in numerous ways.

In a first approach, MCSs adopted for the same MCH are transmitted and a corresponding relationship between the MCCH and an index of an MCS is transmitted to a user equipment over a BCCH; and a corresponding relationship between the MTCH and an index of an MCS is transmitted to the user equipment over the MCCH.

The user equipment may determine, from the corresponding relationship between the MCCH and the index of the MCS, the MCS adopted for the MCCH data transmitted over the MCH and determine, from the corresponding relationship between the MTCH and the index of the MCS, the MCS adopted for the MTCH data transmitted over the MCH.

Particularly, the MCSs adopted for the same MCH are transmitted over the BCCH by configuring subsets including such parameters as a TDM Period, an Offset, a Transmission Length, and an MCS, for example:

Subset 1: (TDM Period 1, Offset 1, Transmission Length 1, MCS 1)

Subset 2: (TDM Period 2, Offset 2, Transmission Length 2, MCS 2)

Subset 3: (TDM Period 3, Offset 3, Transmission Length 3, MCS 3)

The MCS included in the subset may also be replaced with the index of the MCS, that is, a corresponding relationship between the indexes of the MCSs and the different logical channels may be transmitted directly at the network side instead of the specific MCSs after negotiation about the MCSs required for the logical channels is performed in advance between the network side and the user equipment.

The data of the MCCH and the MTCH may be mapped according to the different subsets at the network side, for example, the data of the MCCH is transmitted according to the parameters in the Subset 1, and the data of the MTCH is transmitted according to the parameters in the Subset 2.

Particularly, the TDM Period refers to a period at which a logical channel (or a set of logical channels constituted of a plurality of types of logical channels) appears over the MCH.

It shall be noted that in an embodiment of the invention each type of logical channel corresponds to only one MCS and each MCS may correspond to one type of logical channel or to a set of logical channels constituted of a plurality of types of logical channels, i.e., to a plurality of types of logical channels.

The TDM Period may be defined by a radio frame and particularly defined by the parameter of radioFramePeriod, for example, radioFramePeriod equal=5 indicates that data of a logical channel (or a set of logical channels) appears once in every 5 radio frames.

The TDM Period may alternatively be defined based on another event period, for example, an MBMS scheduling period, where if the MBMS scheduling period is 320 milliseconds (ms), a configuration parameter of SchedbasedPeriod based upon the MBMS scheduling period (a scheduling-based period, that is, a period at which a logical channel appears is set based upon a scheduling period) is set, for example, SchedbasedPeriod=2 indicates that data of a logical channel (or a set of logical channels) appears once in every 2 MBMS scheduling periods.

The TDM Period may mean differently according to different types of logical channels, for example, for the MCCH, the TDM Period may be a repetition period or a modification period of the MCCH; for the MTCH, the TDM Period may be a scheduling period of the MTCH; and for the MSCH, the TDM Period may be a repetition period or a modification period of the MSCH.

Figure 5:
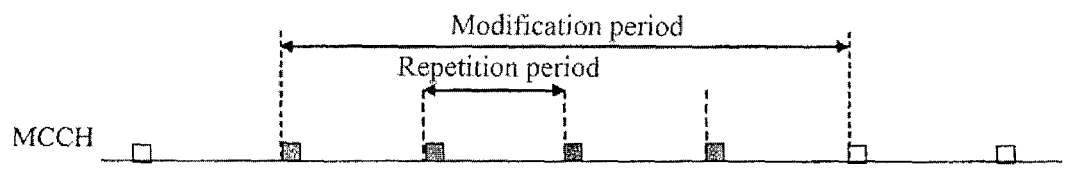
FIG. 5 is a schematic diagram of a transmission scheme of MCCH data according to an embodiment of the invention.

The data of the MCCH is transmitted as illustrated in FIG. 5, where each small square represents the data of the MCCH transmitted in a modification period of the MCCH and/or a repetition period of the MCCH. The data of the MCCH is unchanged in the modification period of the MCCH, and if there is a repetition period of the MCCH, the data of the MCCH is retransmitted in the repetition period of the MCCH, and the UE may receive a plurality of pieces of the same information in the modification period of the MCCH and can acquire the current MCCH data as long as it receives correctly the data once. The data of the MCCH may or may not be different between different modification cycles of the MCCH, that is, the data of the MCCH may or may not be modified at the network side upon arrival of each modification period of the MCCH.

The Offset refers to the location of a specific sub-frame over the MCH in which data of a logical channel starts, for example, for the TDM Period defined based upon a radio frame, the offset=3 indicates that transmission of data of a logical channel (or a set of logical channels) is started from a third sub-frame in a radio frame of a first TDM period or transmission of the data of the logical channel (or the set of logical channels) is started from a third sub-frame of MBSFN available sub-frames in the radio frame of the first TDM period or transmission of the data of the logical channel (or the set of logical channels) is started from a third sub-frame of MCH occupied sub-frames to which the MBSFN available sub-frames in the radio frame of the first TDM period are mapped.

The Transmission Length refers to an amount of sub-frames occupied for data of a logical channel (or a set of logical channels) transmitted in each TDM period of the logical channel (or the set of logical channels).

The MCS refers to an MCS adopted in a sub-frame in which data of a logical channel (or a set of logical channels) is transmitted over the transport channel.

For example, the MCCH corresponds to the Subset 1, and the user equipment may know from the parameter of Offset 1 the starting instance of time at which the MCCH data is received; the user equipment may know from the parameter of Transmission Length 1 the amount of sub-frames occupied for the MCCH data upon each reception of the MCCH data; the user equipment may know from the parameter of MCS 1 which MCS is adopted to receive the MCCH data; and the user equipment may know from the TDM Period an interval at which the MCCH data is received.

Therefore, the user equipment can receive correctly the data of the logical channel according to the parameters carried in the subset corresponding to the logical channel.

It shall be noted that all the foregoing parameters may not be present during configuration, for example, when a fixed amount of sub-frames are occupied for data of a logical channel (or a set of logical channels), the fixed value may be appointed in advance between the network side and the user equipment so that the parameter of "Transmission Length" may not be configured in a subset.

In the first approach, the parameters of the respective subsets are transmitted over the BCCH, and only a corresponding relationship between logical channels (or sets of logical channels), such as the MTCH, and indexes of the subsets is carried over the MCCH.

Of course, the corresponding relationship between the logical channels and the subsets (including the MCSs or the indexes of the MCSs) may be transmitted over the BCCH.

In a second approach, since the user equipment receives firstly the MCCH data and then the MTCH data, the corresponding relationship between the MCCH and the MCS may be transmitted to the user equipment over the BCCH, and the corresponding relationship between the MTCH and the MCS may be transmitted to the user equipment over the MCCH.

In the case that the MCSs are stored in advance in the user equipment, the corresponding relationship between the MCCH and the index of the MCS may be transmitted to the user equipment over the BCCH, and the corresponding relationship between the MTCH and the index of the MCS may be transmitted to the user equipment over the MCCH.

The index of the MCS as described in the embodiment of the invention may be an identifier of the MCS.

The user equipment knows from the BCCH the MCS adopted for the sub-frame carrying the MCCH data and knows from the MCCH the MCS adopted for the sub-frame carrying the MTCH data.

Specifically, in the second approach, an MCS may be carried in a subset as in the first approach, and the corresponding relationship between the MCCH and the subset is transmitted over the BCCH and the corresponding relationship between the MTCH and the subset is transmitted over the MCCH.

In the embodiment of the invention, the operations at the network side may be performed by a base station or another network node.

Correspondingly, a data reception method according to an embodiment of the invention includes the following steps.

In a first step, a user equipment acquires a corresponding relationship between logical channels and MCSs (or indexes of the MCSs), which is notified from the network side.

In a second step, the user equipment determines, from the corresponding relationship, an MCS adopted for data of a logical channel among data of a plurality of types of logical channels transmitted over the same transport channel from the network side.

In a third step, the user equipment demodulates and decodes the data of the corresponding logical channel according to the MCS determined in the second step.

In the foregoing embodiment, if the user equipment is going to receive data of some of the logical channels mapped onto the same transport channel, it will be sufficient if MCSs corresponding to those logical channels to be received are determined in the second step.

The user equipment acquires, from the Broadcast Control Channel (BCCH), the MCSs corresponding to the logical channels among the types of logical channels mapped onto the same transport channel, which is notified from the network side, where the logical channels may or may not correspond to the same MCS.

The user equipment may acquire the corresponding relationship between the logical channels among the types of logical channels mapped onto the same transport channel and the MCSs, which is notified from the network side, as follows:

the user equipment acquires, from the Broadcast Control Channel (BCCH), a corresponding relationship between a specific logical channel determined at the network side and an MCS or an index of the MCS; and the user equipment acquires over the specific logical channel the corresponding relationship between the other logical channels mapped onto the same transport channel than the specific logical channel and the MCSs or the indexes of the MCSs.

Before the user equipment demodulates and decodes the data of the corresponding logical channel, the method may further includes: the user equipment acquires the amount of sub-frames and/or the serial numbers of sub-frames occupied respectively for the plurality of types of logical channels, which are transmitted from the network side.

When the data of the plurality of types of logical channels is transmitted from the network side through Time Division Multiplexing (TDM), the user equipment may demodulate and decode the data of each type of logical channel according to the corresponding MCS.

When the data of the plurality of types of logical channels is transmitted from the network side through TDM-based transport block multiplexing, the user equipment may demodulate and decode the data of more than one types of logical channels to be transmitted in the same sub-frame according to the MCS with the highest reliability among the MCSs corresponding to the more than one types of logical channels, and demodulate and decode the data of one type of logical channel to be transmitted in a separate sub-frame according to the MCS corresponding to the logical channel.

Three specific embodiments will be given below.

In a first embodiment, the MCCH data and the MTCH data are multiplexed through TDM.

As illustrated in FIG. 2, in a period of time, the MCH onto which the MCCH and the MTCH are mapped together includes six sub-frames in total and the MCCH and the MTCH are multiplexed through TDM, that is, a sub-frame in which the MCCH data is transmitted is different from a sub-frame in which the MTCH data is transmitted. As stipulated in advance, MBMS control information shall firstly be transmitted by occupying 3 sub-frames, so the base station modulates and encodes the first three sub-frames over the MCH occupied for transmission of the MCCH data according to the MCS 1 with the high reliability and modulates and encodes the sub-frames occupied for subsequent transmission of the MTCH data according to the MCS 2 with a high spectrum efficiency.

The user equipment receives the MCCH data according to the MCS 1 notified from the base station and the amount of sub-frames and/or the serial numbers of sub/frames occupied for the MCCH data, which are appointed in advance (or notified in a broadcast message), and receives sub-frames occupied for the MTCH data according to the MCS 2 notified from the base station.

In a second embodiment, the MCCH data and the MTCH data are multiplexed through TDM-based transport block multiplexing.

As illustrated in FIG. 3, in a period of time, the MCH onto which the MCCH and the MTCH are mapped together includes six sub-frames in total and the data of the MCCH and the MTCH are multiplexed through TDM-based transport block multiplexing. As stipulated in advance, MBMS control information shall firstly be transmitted by occupying 3 sub-frames, so the base station modulates and encodes sub-frames, in which the MCCH data is transmitted, according to the MCS 1 with the high reliability (although some of the sub-frames may include the data of the MTCH) and modulates and encodes sub-frames in which no MCCH data is included according to the MCS2 with a high spectrum efficiency.

The user equipment receives the MCCH data according to the MCS1 notified from the base station and the amount of sub-frames and/or the serial numbers of sub-frames occupied for the MCCH data, which are appointed in advance (or notified in a broadcast message), and receives the sub-frames occupied for the MTCH data according to the MCS 2 notified from the base station.

Only the scenario in which an MCCH and an MTCH are mapped onto the same MCH has been described above, and of course the method according to the embodiment of the invention may also be applied to another scenario, for example, in which an MCCH, an MTCH, an MSCH or a Media Access Control Control Element (MAC CE) for scheduling and other logical channel(s) are multiplexed onto the same MCH. These logical channels may be multiplexed as illustrated in FIG. 2 or FIG. 3. Different MCSs may be set for the different logical channels, and the UE may be notified of the different MCSs corresponding to the different logical channels over a BCCH and/or an MCCH. Furthermore, the logical channels may alternatively be grouped, and the same MCS may be adopted for the same set of logical channels, for example, data of the Multicast Scheduling Channel (MSCH) and data of the MAC CE may be modulated and encoded according to the same dedicated MCS, or multiplexed with data of the MCCH and/or the MTCH in the same sub-frame and modulated and encoded according to the same MCS as the MCS corresponding to the MCCH and/or the MTCH.

Devices according to embodiments of the invention will be introduced below.

Figure 6:
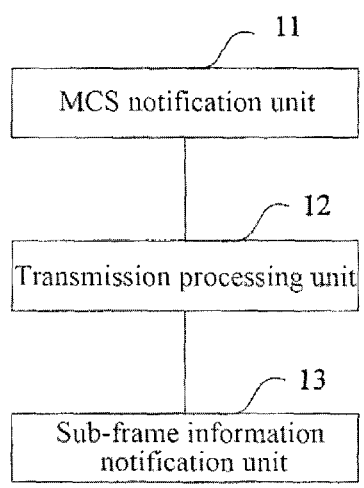
FIG. 6 is a schematic structural diagram of a data transmission device according to an embodiment of the invention.

Referring to FIG. 6, a data transmission device according to an embodiment of the invention includes:

an MCS notification unit 11 configured to determine a plurality of Modulation and Coding Schemes (MCSs) required for the same transport channel, onto which a plurality of types of logical channels are mapped, and notify a user equipment of a corresponding relationship between the logical channels and the MCSs or indexes of the MCSs; and a transmission processing unit 12 configured to modulate and encode data of the logical channels mapped onto the same transport channel according to the MCSs required for the transport channel and then transmit the data to the user equipment over the transport channel.

Figure 7:
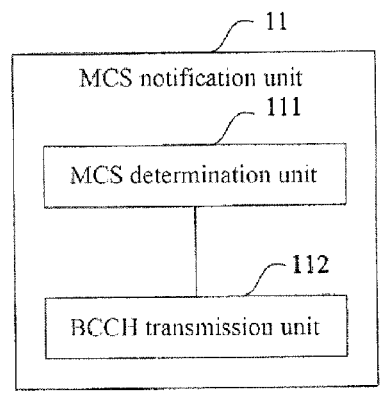
FIG. 7 is a schematic structural diagram of an MCS notification unit according to an embodiment of the invention.

Referring to FIG. 7, the MCS notification unit 11 includes:

an MCS determination unit 111 configured to determine the MCSs required for the same transport channel onto which the plurality of types of logical channels are mapped; and a BCCH transmission unit 112 configured to notify the user equipment of the corresponding relationship between the logical channels and the MCSs or the indexes of the MCSs over a Broadcast Control Channel (BCCH).

Figure 8:
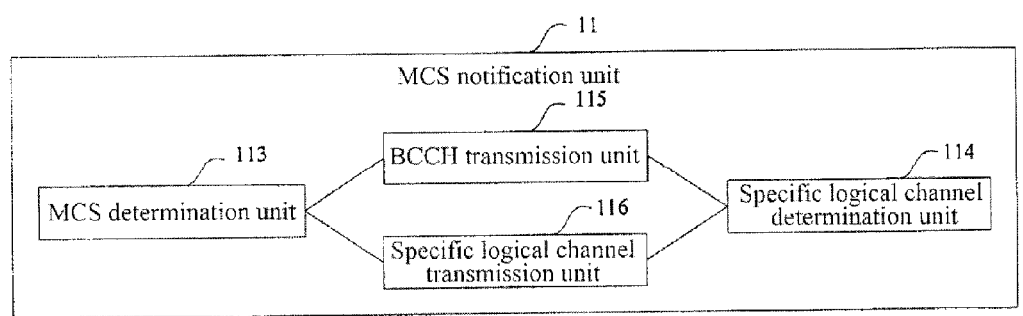
FIG. 8 is a schematic structural diagram of another MCS notification unit according to an embodiment of the invention.

Alternatively, referring to FIG. 8, the MCS notification unit 11 includes:

an MCS determination unit 113 configured to determine the MCSs required for the same transport channel onto which the plurality of types of logical channels are mapped;

a specific logical channel determination unit 114 configured to determine one or more types of specific logical channels among the plurality of types of logical channels mapped on the same transport channel;

a BCCH transmission unit 115 configured to transmit a corresponding relationship between the specific logical channel(s) and an MCS(s) or an index(es) of the MCS(s) to the user equipment over a Broadcast Control Channel (BCCH); and a specific logical channel transmission unit 116 configured to transmit a corresponding relationship between the other logical channels mapped onto the same transport channel than the specific logical channel(s) and MCSs or indexes of the MCSs to the user equipment over the specific logical channel(s).

Referring to FIG. 6, the device preferably further includes:

a sub-frame information notification unit 13 configured to notify the user equipment of an amount of sub-frames and/or serial numbers of sub-frames occupied respectively for the plurality of types of logical channels.

Figure 9:
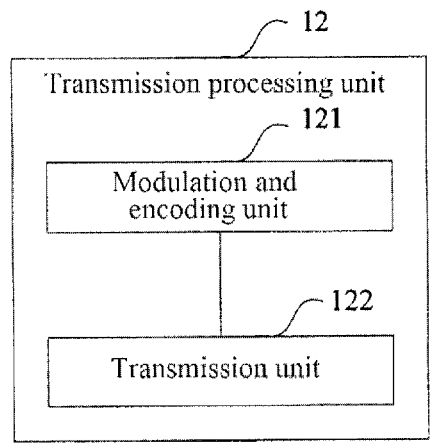
FIG. 9 is a schematic structural diagram of a transmission processing unit according to an embodiment of the invention.

Referring to FIG. 9, the transmission processing unit 12 preferably includes:

a modulation and encoding unit 121 configured to modulate and encode the data of the logical channel according to the MCS corresponding to the logical channel when the data of the plurality of types of logical channels mapped onto the same transport channel is transmitted through Time Division Multiplexing (TDM); or modulate and encode the data of more than one types of logical channels to be transmitted in the same sub-frame according to the MCS with the highest reliability among the MCSs corresponding to the more than one types of logical channels and modulate and encode the data of one type of logical channel to be transmitted in a separate sub-frame according to the MCS corresponding to the logical channel when the data of the plurality of types of logical channels mapped onto the same transport channel is transmitted through TDM-based transport block multiplexing; and a transmission unit 122 configured to transmit to the user equipment over the transport channel the data of the logical channels mapped onto the same transport channel, which is encoded by the modulation and encoding unit 121.

Figure 10:
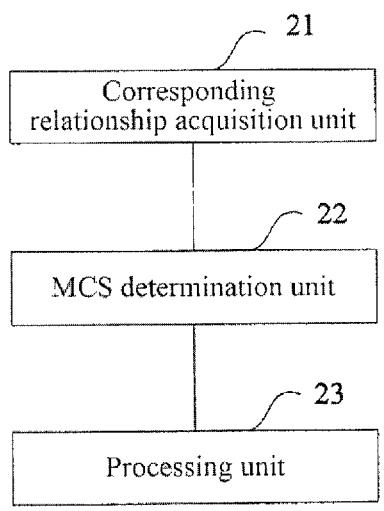
FIG. 10 is a schematic structural diagram of a user equipment according to an embodiment of the invention.

Referring to FIG. 10, a data reception device according to an embodiment of the invention, e.g., a user equipment, may include:

a corresponding relationship acquisition unit 21 configured to acquire a corresponding relationship between a logical channel among a plurality of types of logical channels mapped onto the same transport channel and a Modulation and Coding Scheme (MCS) or an index of the MCS, which is notified from the network side;

an MCS determination unit 22 configured to determine, from the corresponding relationship acquired by the corresponding relationship acquisition unit 21, the MCS adopted for data of the logical channel among data of the plurality of types of logical channels transmitted over the same transport channel from the network side; and a processing unit 23 configured to demodulate and decode the data of the logical channel according to the MCS determined by the MCS determination unit 22.

It shall be noted that in the foregoing embodiment, if the user equipment is going to receive the data over some of the logical channels mapped onto the same transport channel, the MCS determination unit may determine only the MCSs corresponding to those logical channels to be received.

The corresponding relationship acquisition unit 21 is configured to acquire over a Broadcast Control Channel (BCCH) the corresponding relationship between the logical channel among the plurality of types of logical channels mapped onto the same transport channel and the MCS, which is notified from the network side.

The corresponding relationship acquisition unit 21 is configured to acquire a corresponding relationship between a specific logical channel determined at the network side and an MCS or an index of the MCS over a Broadcast Control Channel (BCCH) and acquire a corresponding relationship between the other logical channels mapped onto the same transport channel than the specific logical channel and MCSs or indexes of the MCSs over the specific logical channel.

The device may further include a first acquisition unit configured to acquire an amount of sub-frames and/or serial numbers of sub-frames occupied respectively for the plurality of types of logical channels, which are transmitted from the network side, before the user equipment demodulates and decodes the data of the logical channel.

The processing unit 23 is configured to demodulate and decode the data of the logical channel according to the corresponding MCS.

The processing unit 23 is configured to demodulate and decode the data of more than one types of logical channels to be transmitted in the same sub-frame according to the MCS with the highest reliability among the MCSs corresponding to the more than one types of logical channels, and demodulate and decode the data of one type of logical channel to be transmitted in a separate sub-frame according to the MCS corresponding to the logical channel.

Preferably, a communication system according to an embodiment of the invention includes a base station and at least one user equipment.

The base station is configured to determine a plurality of Modulation and Coding Schemes (MCSs) required for the same transport channel, onto which a plurality of types of logical channels are mapped, and notify the user equipment of a corresponding relationship between the logical channels and the MCSs; and modulate and encode data of the logical channels mapped onto the transport channel according to the MCSs required for the transport channel and then transmit the data to the user equipment over the transport channel. The corresponding relationship between the logical channels and the MCSs may be represented as a corresponding relationship between the logical channels and indexes of the MCSs.

The user equipment is configured to acquire the corresponding relationship between the logical channels and the MCSs, which is transmitted from the base station, determine from the corresponding relationship an MCS adopted for data of a logical channel and demodulate and decode the data of the logical channel according to the determined MCS.

The base station and the user equipment may interact dependent upon the foregoing implementations of the network side and the user equipment, and a repeated description thereof will not be repeated here.

In summary, in the embodiments of the invention, a plurality of Modulation and Coding Schemes (MCSs) required for the same transport channel, onto which a plurality of types of logical channels are mapped, are determined at the network side, and a user equipment is notified of a corresponding relationship between the logical channels and the MCSs or the indexes of the MCSs; and data of the logical channels mapped onto the transport channel is modulated and encoded at the network side according to the MCSs required for the transport channel and then transmitted to the user equipment over the transport channel, so that the MCSs may be adopted over the transport channel, onto which the plurality of types of MBMS-related logical channels are mapped, to thereby satisfy transmission quality requirements of data of the plurality of types of logical channels.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A data transmission method, comprising:
   determining, at the network side, a plurality of Modulation and Coding Schemes, MCSs, required for the same transport channel onto which a plurality of types of logical channels are mapped, and notifying a user equipment of a corresponding relationship between the logical channels and the MCSs; and
   modulating and encoding, at the network side, data of the logical channels mapped onto the transport channel according to the required MCSs, and transmitting the data to the user equipment over the transport channel,
   wherein notifying the user equipment of the corresponding relationship between the logical channels and the MCSs comprises:
      determining, at the network side, one or more types of specific logical channels among the plurality of types of logical channels mapped onto the same transport channel;
      transmitting, at the network side, a corresponding relationship between the specific logical channel(s) and an MCS(s) or an index(es) of the MCS(s) to the user equipment over a Broadcast Control channel, BCCH; and
      transmitting, at the network side, a corresponding relationship between the other logical channels mapped onto the same transport channel than the specific logical channel(s) and MCSs to the user equipment over the specific logical channel(s).

2. The method of claim 1, wherein modulating and encoding at the network side the data of the logical channels mapped onto the transport channel according to the required MCSs comprises:
   when the data of the plurality of types of logical channels is transmitted through Time Division Multiplexing, TDM, modulating and encoding, at the network side, data of each type of logical channel according to a corresponding MCS; or
   when the data of the plurality of types of logical channels is transmitted through TDM-based transport block multiplexing, modulating and encoding, at the network side, data of more than one types of logical channels to be transmitted in the same sub-frame according to an MCS with the highest reliability among MCSs corresponding to the more than one types of logical channels, and modulating and encoding data of one type of logical channel to be transmitted in a separate sub-frame according to an MCS corresponding to the logical channel.

3. The method of claim 1, wherein the corresponding relationship between the logical channels and the MCSs is represented as a corresponding relationship between the logical channels and indexes of the MCSs.

4. A data reception method, comprising:
   acquiring, by a user equipment, a corresponding relationship between a logical channel among a plurality of types of logical channels mapped onto the same transport channel and an MCS, which is notified from the network side;
   determining, by the user equipment, from the corresponding relationship between the logical channel and the MCS, the MCS corresponding to the logical channel mapped at the network side onto the transport channel; and
   demodulating and decoding, by the user equipment, data of the logical channel according to the determined MCS,
   wherein acquiring by the user equipment the corresponding relationship between the logical channel among the plurality of types of logical channels mapped onto the same transport channel and the MCS, which is notified from the network side, comprises:
      acquiring, by the user equipment, a corresponding relationship between a specific logical channel determined at the network side and an MCS over a Broadcast Control Channel, BCCH; and
      acquiring, by the user equipment, a corresponding relationship between the other logical channels mapped onto the same transport channel than the specific logical channel and MCSs.

5. The method of claim 4, wherein when data of the plurality of types of logical channels is transmitted from the network side through Time Division Multiplexing, TDM, demodulating and decoding the data of the logical channel comprises:
   demodulating and decoding, by the user equipment, data of each type of logical channel according to an MCS corresponding to the logical channel.

6. The method of claim 4, wherein when data of the plurality of types of logical channels is transmitted through TDM-based transport block multiplexing, demodulating and decoding the data of the logical channel comprises:
   demodulating and decoding, by the user equipment, data of more than one types of logical channels to be transmitted in the same sub-frame according to an MCS with the highest reliability among MCSs corresponding to the more than one types of logical channels, and demodulating and decoding data of one type of logical channel to be transmitted in a separate sub-frame according to an MCS corresponding to the one type of logical channel.

7. A data transmission device, comprising:
   an MCS notification unit configured to determine a plurality of Modulation and Coding Schemes, MCSs, required for the same transport channel, onto which a plurality of types of logical channels are mapped, and notify a user equipment of a corresponding relationship between the logical channels and the MCSs; and
   a transmission processing unit configured to modulate and encode data of the logical channels mapped onto the transport channel according to the required MCSs and transmit the data to the user equipment over the transport channel, wherein the MCS notification unit comprises:

an MCS determination unit configured to determine the MCSs required for the same transport channel onto which the plurality of types of logical channels are mapped;

a specific logical channel determination unit configured to determine one or more types of specific logical channels among the plurality of types of logical channels mapped on the same transport channel;

a BCCH transmission unit configured to transmit a corresponding relationship between the specific logical channel(s) and an MCS(s) an index es of the MCS(s) to the user equipment over a Broadcast Control Channel, BCCH; and a specific logical channel transmission unit configured to transmit a corresponding relationship between the other logical channels mapped onto the same transport channel than the specific logical channel(s) and MCSs or indexes of the MCSs to the user equipment over the specific logical channel(s).

8. The device of claim 7, wherein the corresponding relationship transmitted by the BCCH transmission unit to the user equipment is represented as a corresponding relationship between the logical channels and indexes of the MCSs.

9. The device of claim 7, wherein the transmission processing unit comprises:

a modulation and encoding unit configured to modulate and encode data of each type of logical channel according to an MCS corresponding to the logical channel when data of the plurality of types of logical channels is transmitted through Time Division Multiplexing, TDM; or modulate and encode data of more than one types of logical channels to be transmitted in the same sub-frame according to an MCS with the highest reliability among MCSs corresponding to the more than one types of logical channels and modulate and encode data of one type of logical channel to be transmitted in a separate sub-frame according to an MCS corresponding to the logical channel when data of the plurality of types of logical channels is transmitted through TDM-based transport block multiplexing; and a transmission unit configured to transmit the data processed by the modulation and encoding unit to the user equipment over the transport channel.

10. A data reception device, comprising:

a corresponding relationship acquisition unit configured to acquire a corresponding relationship between a logical channel among a plurality of types of logical channels mapped onto the same transport channel and a Modulation and Coding Scheme, MCS, which is notified from the network side;

an MCS determination unit configured to determine, from the corresponding relationship between the logical channel and the MCS, the MCS adopted for data of the logical channel transmitted over the same transport channel from the network side; and a processing unit configured to demodulate and decode the data of the logical channel according to the MCS determined by the MCS determination unit, wherein the corresponding relationship acquisition unit is configured to acquire a corresponding relationship between a specific logical channel determined at the network side and an MCS or an index of the MCS over a Broadcast Control Channel, BCCH, and acquire a corresponding relationship between the other logical channels mapped onto the same transport channel than the specific logical channel and MCSs or indexes of the MCSs.

11. The device of claim 10, wherein the processing unit is configured to demodulate and decode data of each type of logical channel according to a corresponding MCS.

12. The device of claim 10, wherein the processing unit is configured to demodulate and decode data of more than one types of logical channels to be transmitted in the same sub-frame according to an MCS with the highest reliability among MCSs corresponding to the more than one types of logical channels, and demodulate and decode data of one type of logical channel to be transmitted in a separate sub-frame according to an MCS corresponding to the logical channel.

* * * * *